(12) United States Patent
Iwasaki et al.

(10) Patent No.: US 8,071,224 B2
(45) Date of Patent: Dec. 6, 2011

(54) DECORATIVE BOARD

(75) Inventors: Atsushi Iwasaki, Ama-gun (JP); Koshi Suzuki, Ama-gun (JP); Akitomo Yokoi, Ama-gun (JP); Masataka Yasui, Ama-gun (JP)

(73) Assignee: Aica Kogyo Co., Ltd., Kiyosu-Shi (JP)

( * ) Notice: Subject to any disclaimer, the term of this patent is extended or adjusted under 35 U.S.C. 154(b) by 34 days.

(21) Appl. No.: 12/597,243

(22) PCT Filed: Mar. 25, 2008

(86) PCT No.: PCT/JP2008/055580
§ 371 (c)(1),
(2), (4) Date: Oct. 23, 2009

(87) PCT Pub. No.: WO2008/136221
PCT Pub. Date: Nov. 13, 2008

(65) Prior Publication Data
US 2010/0136351 A1   Jun. 3, 2010

(30) Foreign Application Priority Data
Apr. 26, 2007  (JP) ................... 2007-116596

(51) Int. Cl.
*B32B 13/00*   (2006.01)
(52) U.S. Cl. ........ 428/532; 428/533; 428/535; 428/536; 428/537.7
(58) Field of Classification Search ............... 428/532, 428/533, 535, 536, 537.7
See application file for complete search history.

(56) References Cited

U.S. PATENT DOCUMENTS

2003/0022577 A1 * 1/2003 Kim et al. ............... 442/180

FOREIGN PATENT DOCUMENTS

| EP | 1134074 | * | 9/2001 |
|---|---|---|---|
| JP | 64056540 | | 3/1989 |
| JP | 2004230611 | * | 8/2004 |
| JP | 2004-268489 | | 9/2004 |
| JP | 200635839 | | 2/2006 |
| JP | 2006035839 | * | 2/2006 |
| WO | 2006/111458 | | 10/2006 |
| WO | WO2006/111458 | * | 10/2006 |

OTHER PUBLICATIONS

English translation of International Report on Patentability from corresponding PCT Application No. PCT/JP2008/055580 dated Nov. 19, 2009.
International Search Report dated Jul. 1, 2008 issued in related International Patent Application No. PCT/JP2008/055580.
Database WPI Week 200460 Thomson Scientific, London, GB; AN 2004-618557, XP002598406 & JP 2004 230611 A (AICA Kogyo Co Ltd), Aug. 19, 2004.
Extended Search Report from corresponding European Application No. 08722790.6 dated Sep. 17, 2010.
Office Action from corresponding Australian Application No. 2008246823 dated Sep. 19, 2011.

* cited by examiner

*Primary Examiner* — Leszek Kiliman
(74) *Attorney, Agent, or Firm* — Grossman, Tucker, Perreault & Pfleger, PLLC

(57) ABSTRACT

A decorative board in the present invention includes: a core layer constituted by a prepreg impregnated with a slurry containing (a) an organic resin component including a phenol-formaldehyde resin and an amino-formaldehyde resin, (b) one or more selected from a group consisting of carbonate, silica, talc and fly ash, and (c) a metal hydroxide; and a decorative layer.

9 Claims, 1 Drawing Sheet

DECORATIVE BOARD

TECHNICAL FIELD

This invention relates to a decorative board, particularly to a non-combustible decorative board.

BACKGROUND ART

Conventionally, there is a known decorative board with fireproof performance and non-combustibility (hereinafter referred to as a "non-combustible decorative board"). Such a non-combustible decorative board includes a core layer, which is a prepreg formed by impregnating an inorganic fiber nonwoven fabric with a slurry including phenol resin or melamine resin as a binder component (see Patent Documents 1-3).

Patent Document 1: Japanese Unexamined Patent Application Publication No. 2004-230611
Patent Document 2: Japanese Unexamined Patent Application Publication No. 10-44323
Patent Document 3: Japanese Unexamined Patent Application Publication No. 64-56540

DISCLOSURE OF THE INVENTION

Problems to be Solved by the Invention

However, a non-combustible decorative board in which a prepreg containing phenol resin as a binder component is used as a core layer has a limitation in additive amount of the binder component, in order to ensure non-combustibility. Accordingly, a finished non-combustible decorative board is slightly inferior in strength and interlayer adhesion. Also, since the additive amount of the binder component is limited, and thereby a blending ratio of an inorganic filler is increased, smoothness of a surface of the non-combustible decorative board may be deteriorated.

On the other hand, a non-combustible decorative board, in which a prepreg containing melamine resin as a binder component is used as a core layer can ensure non-combustibility even when the additive amount of the binder component is significantly increased, as compared with the case of phenol resin. However, melamine resin itself is hard and brittle, and thus the finished non-combustible decorative board sometimes has an inferior strength.

The present invention, which was made in view of the above, has an object to obtain a decorative board having non-combustibility while achieving excellent interlayer adhesion, strength and surface smoothness.

Means for Solving the Problems

A decorative board in the present invention includes a core layer constituted by a prepreg including an inorganic fiber substrate impregnated with a slurry and a decorative layer, and the slurry contains (a) an organic resin component including a phenol-formaldehyde resin and an amino-formaldehyde resin, (b) one or more selected from a group consisting of carbonate, silica, talc and fly ash, and (c) a metal hydroxide.

The decorative board in the present invention has a high non-combustibility, and also has high interlayer adhesion and strength since the core layer is constituted by the prepreg including the inorganic fiber substrate impregnated with (a) the organic resin component including the phenol-formaldehyde resin and the amino-formaldehyde resin, (b) one or more selected from the group consisting of carbonate, silica, talc and fly ash, and (c) the metal hydroxide.

The decorative board in the present invention has an excellent surface smoothness since the decorative board includes the above-described core layer (particularly since the component (b) and the component (c) are contained in the slurry).

The decorative board in the present invention preferably contains a silane coupling agent in the slurry. Concurrent use of the silane coupling agent with the phenol-formaldehyde resin and the amino-formaldehyde resin can further improve physical properties, such as adhesion, non-combustibility, strength, heat resistance, and impregnation property.

As the silane coupling agent, for example, an epoxy silane coupling agent, an amino silane coupling agent, and an acryl silane coupling agent are preferable in terms of adhesion. Especially when an epoxy silane coupling agent is used, its high reactivity with an amino-formaldehyde resin and a phenol-formaldehyde resin leads to an improved interlayer strength.

Also, when an amino silane coupling agent is used, its high reactivity with an amino-formaldehyde resin and a phenol-formaldehyde resin leads to an improved interlayer strength.

The epoxy silane coupling agent includes, for example, $\beta$-(3,4-epoxycyclohexyl)ethyltrimethoxysilane), $\gamma$-glycidyloxypropyltrimethoxysilane, $\gamma$-glycidyloxypropylmethyldiethoxysilane, glycidoxypropyltrimethoxysilane, etc.

The amino silane coupling agent includes, for example, 3-aminopropyltrimethoxysilane, 3-aminopropyltriethoxysilane, N-(2-aminoethyl)-3-aminopropyltrimethoxysilane, N-(2-aminoethyl)-3-aminopropylmethyldimethoxy silane, N-(trimethoxysilylpropyl)ethylenediamine, 3-ureidepropyltriethoxysilane, isopropyltri(N-amidoethyl.aminoethyl)titanate, etc.

The acryl silane coupling agent includes, for example, a silane coupling agent having a methacrylo group in a framework, such as $\gamma$-methacryloxypropyltrimethoxysilane and $\gamma$-methacryloxypropylmethyldimethoxysilane, etc.

In the slurry, a blending amount of the silane coupling agent is preferably 0.01-0.5 parts by weight per part by weight of the solid content of the component (a). Since the blending amount of the silane coupling agent is 0.01 or more parts by weight, strength and interlayer adhesion of the decorative board are further improved. Also, since the blending amount of the silane coupling agent is 0.5 or less parts by weight, impregnation appropriateness of the slurry is further improved.

In the slurry, a blending amount in solid equivalent of the amino-formaldehyde resin is preferably 0.1-5 parts by weight per part by weight of a solid content of the phenol-formaldehyde resin.

Since the blending amount of the amino-formaldehyde resin is 0.1 or more parts by weight, strength and interlayer adhesion of the decorative board are further increased. Also, since the blending amount is 5 or less parts by weight, warpage of the decorative board can be reduced.

A total blending amount in solid equivalent of the component (b) and the component (c) is preferably 4-19 parts by weight per part by weight of a solid content of the component (a).

Since the total blending amount in solid equivalent of the component (b) and the component (c) is 4 or more parts by weight, non-combustibility is further improved. Also, the total blending amount is 19 or less parts by weight, interlayer adhesion is further increased.

A content ratio of the slurry in the prepreg is preferably 500-3000% according to a calculation method indicated by a formula 1.

[Formula 1]

$$\text{Solid content ratio of slurry (\%)} = \frac{\text{Weight of prepeg solid content} - \text{Weight of inorganic fiber substrate}}{\text{Weight of inorganic fiber substrate}} \times 100 \quad (1)$$

Since the content ratio of the slurry in the prepreg is 500% or more, interlayer adhesion is further improved. Also, since the content of the slurry is 3000% or less, falling of a solid content is unlikely to increase, and thus easier handling of the decorative board can be achieved.

The inorganic fiber substrate includes, for example, an unwoven fabric or a woven fabric, etc. constituted by inorganic fiber, such as glass fiber, rock wool, carbon fiber, and ceramic fiber. Particularly preferable is a glass fiber unwoven fabric, which is excellent in heat resistance, flame resistance, and easiness of slurry impregnation. It is preferable that the inorganic fiber substrate weighs in a range of 10-200 g/m$^2$.

The phenol-formaldehyde resin is obtained, for example, by reacting one of phenols with one of formaldehydes at a ratio of 1 mol of a phenol hydroxyl group to 1-3 mols of an aldehyde under the influence of a basic catalyst or an acid catalyst. The phenols include, for example, phenol, cresol, xylenol, octylphenol, phenylphenol, bisphenol A, bisphenol S, bisphenol F, etc. The aldehydes include, for example, formaldehyde, paraformaldehyde, glyoxal, trioxal, etc.

Also, as needed, a phenol-formaldehyde resin which is modified with a modifier for accelerating plasticization, such as urea, urea derivative, paratoluenesulfonamide, wood oil, phosphate esters, and glycols, may be applicable.

The basic catalyst to be used for synthesizing of the phenol-formaldehyde resin includes, for example, oxides or hydroxides of alkali metals (such as sodium and potassium) or alkaline-earth metals (magnesium, calcium, and the like), amines, such as triethylamine and triethanolamine, ammonia, etc. The acid catalyst includes, for example, para-toluenesulfonic acid, hydrochloric acid, etc.

As the amino-formaldehyde resin, for example, an initial condensate obtained by reacting an amino compound (such as melamine, urea, benzoguanamine, and acetoguanamine) and formaldehyde, a substance obtained by etherifying the initial condensate with a lower alcohol, such as methyl alcohol and butyl alcohol, and a substance obtained by modifying the initial condensate with a reactive modifier for accelerating plasticization, such as para-toluenesulfonamide, may be applicable. Among these, melamine-formaldehyde resin which is excellent in durability is preferable.

The metal hydroxide includes, for example, aluminum hydroxide and magnesium hydroxide.

The carbonate includes, for example, calcium carbonate, magnesium carbonate, barium carbonate, strontium carbonate, beryllium carbonate, zinc carbonate, etc.

An average particle diameter of the component (b) is preferably in a range of 0.5-200 μm. When the average particle diameter is in this range, impregnation appropriateness of the slurry into the inorganic substrate can be further improved.

It is preferable to use, as the component (b), a carbonate, particularly calcium carbonate, which is advantageous in terms of workability and cutting performance, and use, as the component (c), aluminum hydroxide or magnesium hydroxide which is advantageous in terms of non-combustibility since crystal water is contained, and, at a high temperature, decomposition occurs, endotherm is performed, and bonding water is released. In this case, a blending ratio of the carbonate and the metal hydroxide (aluminum hydroxide, magnesium hydroxide) is preferably 1 part by weight of the carbonate to 2-15 parts by weight of the metal hydroxide so that a smooth and good surface appearance can be obtained. Since a blending amount of the metal hydroxide is 2 or more parts by weight, an excellent non-combustibility can be achieved. Since the blending amount of the metal hydroxide is 15 or less parts by weight, the metal hydroxide in the slurry is unlikely to precipitate, and thus an impregnation amount of the slurry can be easily controlled. Also, since the blending amount of the metal hydroxide is 15 or less parts by weight, wear of a cutting tool to be used for cutting the decorative board can be reduced.

Although there is no limitation to the calcium carbonate and, for example, heavy calcium carbonate, light calcium carbonate (precipitated calcium carbonate) or the like may be used, heavy calcium carbonate is preferable. An average particle diameter of the calcium carbonate is preferably in a range of 0.05-10 μm, and more preferably in a range of 1-5 μm. In a case of 0.05(1) μm or more, secondary aggregation is unlikely to occur and agglomerates are unlikely to be formed, and thus an excellent impregnation property of the slurry can be achieved. In a case of 10(5) μm or less, the decorative board has a further smooth surface and thus has a good appearance. The light calcium carbonate means calcium carbonate chemically produced by baking limestone, while the heavy calcium carbonate means fine-powdered calcium carbonate produced by dry or wet pulverization of white crystalline limestone.

In the decorative board of the present invention, the decorative layer may be provided either on one side of the core layer or on both sides thereof. Forming methods of the decorative layer include, for example, a forming method by painting, a method using resin impregnated decorative paper, a method of transferring a decorative layer using a transfer foil, etc. Among these, the method using resin impregnated decorative paper is particularly preferable in terms of productivity, adhesion with the core layer, and wear resistance.

The forming method by painting includes, for example, a method by painting on the core layer a resin liquid, in which a curing agent (such as methyl ethyl ketone peroxide), a curing accelerator (such as cobalt naphthenate) are blended to unsaturated polyester resin colored with a pigment, and subsequently covering a painted surface with a vinylon film or a PET film, spreading with a roller, and peeling the vinylon film after the resin is cured.

The unsaturated polyester resin is obtained by performing a dehydration-condensation reaction, according to a usual method, of an unsaturated dibasic acid and/or an acid anhydride thereof, another saturated acid and/or an acid anhydride thereof to be used as needed, and a polyalcohol, under an inert gas atmosphere, such as nitrogen and argon, at a temperature of about 160-230° C. and preferably 210-230° C., and then adding a polymerizable monomer, such as styrene monomer.

The method using resin impregnated decorative paper is a method in which a base paper for decorative board is impregnated with a resin liquid containing a thermosetting resin as a main component and is dried to obtain a resin impregnated decorative paper, and then the resin impregnated decorative paper is stacked and thermocompression forming is performed. The resin impregnated decorative paper may be obtained by impregnating a resin liquid containing a thermosetting resin, such as amino-formaldehyde resin, diallyl phthalate resin, and unsaturated polyester resin into a decorative paper for decorative board weighing 30-140 g/m$^2$ such that an impregnation rate as indicated by the formula 2 is 80-300%. Thermocompression forming may be performed using a press machine, such as a flat press machine and a continuous press machine.

[Formula 2]

$$\text{Impregnation rate (\%)} = \frac{\text{Weight of resin impregnated decorative paper} - \text{Weight of decorative paper}}{\text{Weight of decorative paper}} \times 100 \quad (2)$$

EXPLANATION OF REFERENCE NUMERALS

Figure 1:
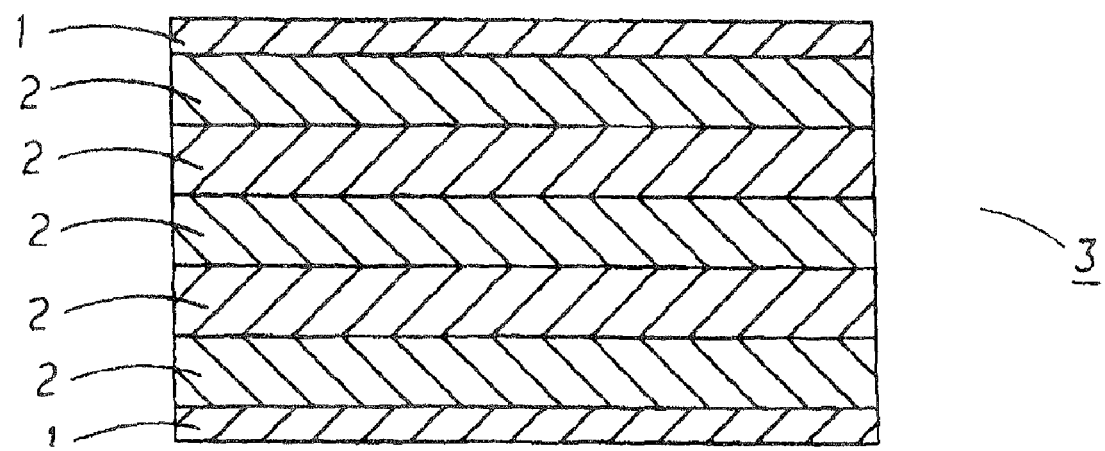
FIG. 1 is a structural cross-sectional view of a non-combustible decorative board in Embodiment 1.

1 . . . melamine resin impregnated decorative paper, 2 . . . prepreg, 3 . . . non-combustible decorative board

BEST MODE FOR CARRYING OUT THE INVENTION

Although the present invention will be described in more detail hereinafter with reference to embodiments and comparative examples, these examples are not to particularly limit the invention but to illustrate the invention more specifically.

Embodiment 1

1. Production of Core Layer

A slurry was prepared according to the following composition:

Phenol-formaldehyde resin: 4.5 parts by weight (in solid equivalent)

Amino-formaldehyde resin: 3.5 parts by weight (in solid equivalent)

Calcium carbonate having an average particle diameter of 1.8 μm: 16.5 parts by weight Aluminum hydroxide having an average particle diameter of 12 μm: 75 parts by weight Glycidoxypropyltrimethoxysilane as a silane coupling agent (SH-6040: produced by Dow Corning Toray Co., Ltd.): 0.5 parts by weight The above slurry was impregnated into a glass fiber unwoven fabric of 50 g/m$^2$ such that a solid content ratio of the slurry as defined by the formula 1 was 1200% to obtain a prepreg. The prepreg was used as a core layer.

2. Production of Decorative Layer

A resin liquid containing melamine-formaldehyde resin as a main component was impregnated into a plain-patterned decorative paper weighing 120 g/m$^2$ such that an impregnation rate as defined by a formula 2 was 100% to obtain a melamine resin impregnated decorative paper.

3. Production of Non-combustible Decorative Board

As shown in FIG. 1, one sheet of the melamine resin impregnated decorative paper 1, five sheets of the prepreg 2, and one sheet of the melamine resin impregnated decorative paper 1 are stacked from below in this order, and then thermocompression forming was performed under conditions of 140° C., 100 kg/cm$^2$, and 90 minutes to obtain a non-combustible decorative board 3.

Respective compositions of non-combustible decorative boards in the present Embodiment 1 and later-described embodiments and comparative examples are shown in Table 1. The unit of values shown in Table 1 is part by weight.

TABLE 1

|  | Phenol-formaldehyde resin | Amino-formaldehyde resin | Metal hydroxide | Inorganic filler other than metal hydroxide | Silane coupling agent |
|---|---|---|---|---|---|
| Embodiment 1 | 4.5 | 3.5 | 75 | 16.5 | 0.5 |
| Embodiment 2 | 4.5 | 3.5 | 75 | 16.5 | 0.1 |
| Embodiment 3 | 4.5 | 3.5 | 75 | 16.5 | 3.0 |
| Embodiment 4 | 4.5 | 3.5 | 75 | 16.5 | 3.8 |
| Embodiment 5 | 12 | 10.5 | 75 | 16.5 | 0.5 |
| Embodiment 6 | 2.5 | 2.5 | 75 | 16.5 | 0.5 |
| Embodiment 7 | 4.5 | 3.5 | 75 | 35 | 0.5 |
| Embodiment 8 | 4.5 | 3.5 | 75 | 5 | 0.5 |
| Embodiment 9 | 4.5 | 3.5 | 75 | 16.5 | 0.5 |
| Embodiment 10 | 4.5 | 3.5 | 75 | 16.5 | 0.5 |
| Embodiment 11 | 4.5 | 3.5 | 75 | 16.5 | 0.5 |
| Embodiment 12 | 4.5 | 3.5 | 75 | 16.5 | 0.5 |
| Embodiment 13 | 4.5 | 3.5 | 75 | 16.5 | 0.5 |
| Embodiment 14 | 4.5 | 3.5 | 75 | 16.5 | 0.5 |
| Embodiment 15 | 4.5 | 0.45 | 75 | 16.5 | 0.5 |
| Embodiment 16 | 3 | 15 | 75 | 16.5 | 0.5 |
| Embodiment 17 | 4.5 | 3.5 | 75 | 16.5 | 0.05 |
| Embodiment 18 | 4.5 | 3.5 | 75 | 16.5 | 5 |
| Embodiment 19 | 4.5 | 0.3 | 75 | 16.5 | 0.5 |
| Embodiment 20 | 2.8 | 15 | 75 | 16.5 | 0.5 |
| Embodiment 21 | 13.5 | 10.5 | 75 | 16.5 | 0.5 |
| Embodiment 22 | 2.5 | 1.5 | 75 | 16.5 | 0.5 |
| Comparative Example 1 | 4.5 | 3.5 | 75 | 0 | 0.5 |
| Comparative Example 2 | 4.5 | 3.5 | 0 | 75 | 0.5 |
| Comparative Example 3 | 0 | 8.0 | 75 | 16.5 | 0.5 |
| Comparative Example 4 | 8.0 | 0 | 75 | 16.5 | 0.5 |

Embodiment 2

A non-combustible decorative board was produced in a same manner as in Embodiment 1, except that a blending amount of the silane coupling agent in a slurry was 0.1 parts by weight.

Embodiment 3

A non-combustible decorative board was produced in the same manner as in Embodiment 1, except that the blending amount of the silane coupling agent in a slurry was 3.0 parts by weight.

Embodiment 4

A non-combustible decorative board was produced in the same manner as in Embodiment 1, except that the blending amount of the silane coupling agent in a slurry was 3.8 parts by weight.

Embodiment 5

A non-combustible decorative board was produced in the same manner as in Embodiment 1, except that a blending amount of the phenol-formaldehyde resin was 12 parts by weight and a blending amount of the amino-formaldehyde resin was 10.5 parts by weight in a slurry.

Embodiment 6

A non-combustible decorative board was produced in the same manner as in Embodiment 1, except that the blending amount of the phenol-formaldehyde resin in a slurry was 2.5 parts by weight (in solid equivalent) and the blending amount of the amino-formaldehyde resin was 2.5 parts by weight (in solid equivalent).

Embodiment 7

A non-combustible decorative board was produced in the same manner as in Embodiment 1, except that a blending amount of calcium carbonate in a slurry was 35 parts by weight.

Embodiment 8

A non-combustible decorative board was produced in the same manner as in Embodiment 1, except that the blending amount of calcium carbonate in a slurry was 5 parts by weight.

Embodiment 9

A non-combustible decorative board was produced in the same manner as in Embodiment 1, except that in place of glycidoxypropyltrimethoxysilane, a same amount of 3-(2-aminoethyl)aminopropyltrimethoxysilane was blended into a slurry as the silane coupling agent.

Embodiment 10

A non-combustible decorative board was produced in the same manner as in Embodiment 1, except that in place of glycidoxypropyltrimethoxysilane, a same amount of methacryloxypropyltrimethoxysilane was blended into a slurry as the silane coupling agent.

Embodiment 11

A non-combustible decorative board was produced in the same manner as in Embodiment 1, except that in place of aluminum hydroxide, a same amount of magnesium hydroxide was blended into a slurry.

Embodiment 12

A non-combustible decorative board was produced in the same manner as in Embodiment 1, except that in place of calcium carbonate, a same amount of silica was blended into a slurry.

Embodiment 13

A non-combustible decorative board was produced in the same manner as in Embodiment 1, except that in place of calcium carbonate, a same amount of talc was blended into a slurry.

Embodiment 14

A non-combustible decorative board was produced in the same manner as in Embodiment 1, except that in place of calcium carbonate, a same amount of fly ash was blended into a slurry.

Embodiment 15

A non-combustible decorative board was produced in the same manner as in Embodiment 1, except that the blending amount of the amino-formaldehyde resin in a slurry was 0.45 parts by weight (in solid equivalent).

Embodiment 16

A non-combustible decorative board was produced in the same manner as in Embodiment 1, except that the blending amount of the phenol-formaldehyde resin was 3 parts by weight (in solid equivalent) and the blending amount of the amino-formaldehyde resin was 15 parts by weight (in solid equivalent) in a slurry.

Embodiment 17

A non-combustible decorative board was produced in the same manner as in Embodiment 1, except that the blending amount of the silane coupling agent in a slurry was 0.05 parts by weight.

Embodiment 18

A non-combustible decorative board was produced in the same manner as in Embodiment 1, except that the blending amount of the silane coupling agent in a slurry was 5 parts by weight.

Embodiment 19

A non-combustible decorative board was produced in the same manner as in Embodiment 1, except that the blending amount of the amino-formaldehyde resin in a slurry was 0.3 parts by weight (in solid equivalent).

Embodiment 20

A non-combustible decorative board was produced in the same manner as in Embodiment 1, except that the blending amount of the phenol-formaldehyde resin was 2.8 parts by weight (in solid equivalent) and the blending amount of the amino-formaldehyde resin was 15 parts by weight (in solid equivalent) in a slurry.

Embodiment 21

A non-combustible decorative board was produced in the same manner as in Embodiment 1, except that the blending amount of the phenol-formaldehyde resin was 13.5 parts by weight (in solid equivalent) and the blending amount of the amino-formaldehyde resin was 10.5 parts by weight (in solid equivalent) in a slurry.

Embodiment 22

A non-combustible decorative board was produced in the same manner as in Embodiment 1, except that the blending amount of the phenol-formaldehyde resin was 2.5 parts by weight (in solid equivalent) and the blending amount of the amino-formaldehyde resin was 1.5 parts by weight (in solid equivalent) in a slurry.

Comparative Example 1

A non-combustible decorative board was produced in the same manner as in Embodiment 1, except that calcium carbonate was not blended into a slurry.

Comparative Example 2

A non-combustible decorative board was produced in the same manner as in Embodiment 1, except that aluminum hydroxide was not blended into a slurry and the blending amount of calcium carbonate in the slurry was 75 parts by weight.

Comparative Example 3

A non-combustible decorative board was produced in the same manner as in Embodiment 1, except that the phenol-formaldehyde resin was not blended into a slurry and the blending amount of the amino-formaldehyde resin was 8 parts by weight (in solid equivalent).

Comparative Example 4

A non-combustible decorative board was produced in the same manner as in Embodiment 1, except that the amino-formaldehyde resin was not blended into a slurry and the blending amount of the phenol-formaldehyde resin was 8 parts by weight (in solid equivalent).

Evaluation of Decorative Boards

The decorative boards produced in the respective embodiments and comparative examples were evaluated according to a method described below.

(i) Evaluation of Non-Combustibility

Heat release tests using a cone calorimeter according to ISO5660 were performed, and evaluation was made according to the following criteria.

⊚: During a test for 20 minutes, a total heat release is equal to or less than 8 MJ/m$^2$, a maximum heat release rate remains not exceeding 200 kW/m$^2$ for consecutive 10 seconds or more, and a test object after the test has no breakage or crack passing through to a reverse surface thereof.

○: During a test for 10 minutes, a total heat release is equal to or less than 8 MJ/m$^2$, a maximum heat release rate remains not exceeding 200 kW/m$^2$ for consecutive 10 seconds or more, and a test object after the test has no breakage or crack passing through to a reverse surface thereof.

×: Any one of requirements indicated in ⊚ or ○ is not satisfied.

(ii) Evaluation of Heat-Resistant Adhesion

A heating body held at a temperature of 200° C. was made to contact with a surface of each decorative board for 10 minutes, and evaluation was made according to the following criteria.

⊚: No interlayer delamination, swelling or crack occurs after 10 minutes.

○: Interlayer delamination, swelling or crack occurs in 5 minutes or more and less than 10 minutes.

Δ: Interlayer delamination, swelling or crack occurs in 30 seconds or more and less than 5 minutes.

×: Remarkable delamination, swelling or crack occurs in 30 seconds or less.

(iii) Evaluation of Strength

A steel ball of 28 g was dropped on the surface of each non-combustible decorative board while gradually increasing a dropping height, and evaluation was made according to the following criteria.

⊚: The dropping height is 800 mm or more when a crack occurs.

○: The dropping height is 700 mm or more and less than 800 mm when a crack occurs.

Δ: The dropping height is 600 mm or more and less than 700 mm when a crack occurs.

×: The dropping height is less than 600 mm when a crack occurs.

(iv) Evaluation of Impregnation Property

Evaluation was made on impregnation property of the slurry used in each of the embodiments and comparative examples according to the following criteria.

⊚: It was possible to impregnate a glass fiber substrate with the slurry corresponding to a desired resin rate in a continuous and stable manner for a long time period.

○: Although desired impregnation was possible, periodic adjustment of slurry viscosity or the like was required in a case of performing continuous impregnation.

Δ: Although desired impregnation was possible, continuous impregnation was impossible due to large effects of time-dependent changing factors, such as thickening.

×: An impregnation amount could not be controlled due to aggregation.

(v) Evaluation of Surface Smoothness

Evaluation was made on a degree of "orange peel" of the surface of the decorative board.

Measurement of the surface of the decorative board was performed three times using a BYK Gardener wave-scan DOI (an orange peel/distinctness of image measuring instrument). Evaluation was made on average values of Longwave values and Wc values, respectively, according to criteria shown in Table 2 below. It is indicated that the lower the Longwave value or the Wc value is, the greater the smoothness is.

TABLE 2

|  | Wc | | |
| --- | --- | --- | --- |
| Longwave | 30 or less | 30-50 | 50 or more |
| 25 or less | ⊚ | ○ | Δ |
| 25-40 | ○ | Δ | X |
| 40 or more | Δ | X | X |

Evaluation results are shown in Table 3.

TABLE 3

| | Non-combustibility | Heat resistant adhesion | Strength | Impregnation appropriateness | Surface smoothness |
|---|---|---|---|---|---|
| Embodiment 1 | ◎ | ◎ | ◎ | ◎ | ◎ |
| Embodiment 2 | ◎ | ◎ | ◎ | ◎ | ◎ |
| Embodiment 3 | ◎ | ◎ | ◎ | ◎ | ◎ |
| Embodiment 4 | ◎ | ◎ | ◎ | ○ | ◎ |
| Embodiment 5 | ◎ | ◎ | ◎ | ◎ | ◎ |
| Embodiment 6 | ◎ | ◎ | ◎ | ○ | ○ |
| Embodiment 7 | ◎ | ◎ | ◎ | ○ | ○ |
| Embodiment 8 | ◎ | ◎ | ◎ | ○ | ○ |
| Embodiment 9 | ◎ | ◎ | ◎ | ◎ | ◎ |
| Embodiment 10 | ◎ | ◎ | ◎ | ◎ | ◎ |
| Embodiment 11 | ◎ | ○ | ○ | △ | ○ |
| Embodiment 12 | ◎ | ○ | ○ | △ | ○ |
| Embodiment 13 | ◎ | ◎ | ◎ | ○ | ◎ |
| Embodiment 14 | ◎ | ○ | ◎ | ○ | ◎ |
| Embodiment 15 | ◎ | ○ | △ | ○ | ◎ |
| Embodiment 16 | ○ | △ | ○ | ○ | ◎ |
| Embodiment 17 | ◎ | ○ | ○ | ○ | ○ |
| Embodiment 18 | ○ | ○ | ○ | ○ | ◎ |
| Embodiment 19 | ◎ | ○ | △ | ○ | △ |
| Embodiment 20 | ○ | △ | ○ | △ | ◎ |
| Embodiment 21 | ○ | △ | ○ | ○ | ◎ |
| Embodiment 22 | ◎ | △ | △ | △ | △ |
| Comparative Example 1 | ◎ | ◎ | ○ | △ | X |
| Comparative Example 2 | X | ◎ | ○ | △ | X |
| Comparative Example 3 | ○ | X | X | X | △ |
| Comparative Example 4 | X | △ | ○ | ○ | △ |

As shown in Table 3, the decorative board in each of the embodiments was excellent in any of non-combustibility, heat resistant adhesion, strength, impregnation appropriateness, and surface smoothness.

Also, in the decorative board in each of the embodiments, chipping during a cutting process, delamination of a decorative layer, edge defect, dent or crack during construction work will not occur, and interlayer puncture due to radiant heat will not occur when the decorative board is used for a cooking stove.

What is claimed is:

1. A decorative board comprising:
   a core layer comprising one or more prepreg layers, said prepeg layer including an inorganic fiber substrate impregnated with a slurry; and
   a decorative layer disposed over at least part of said core layer,
   the slurry comprising (a) an organic resin component including a phenol-formaldehyde resin and an amino-formaldehyde resin, (b) one or more selected from a group consisting of carbonate, silica, talc and fly ash, and (c) a metal hydroxide.

2. The decorative board according to claim 1, wherein the decorative layer comprises melamine resin impregnated paper.

3. The decorative board according to claim 1, wherein in the slurry, the component (b) is one or more selected from a group consisting of calcium carbonate, talc, and fly ash.

4. The decorative board according to claim 1, wherein, in the slurry, the component (c) is aluminum hydroxide.

5. The decorative board according to claim 1, wherein a blending amount in solid equivalent of the amino-formaldehyde resin is 0.1-5 parts by weight per part by weight of a solid content of the phenol-formaldehyde resin in the slurry, and wherein a total blending amount in solid equivalent of the component (b) and the component (c) is 4-19 parts by weight per part by weight of a solid content of the component (a).

6. The decorative board according to claim 1, wherein the slurry further comprises a silane coupling agent.

7. The decorative board according to claim 1, wherein the slurry further comprises:
   a silane coupling agent; and
   wherein a blending amount in solid equivalent of the amino-formaldehyde resin is 0.1-5 parts by weight per part by weight of a solid content of the phenol-formaldehyde resin in the slurry, and wherein a total blending amount in solid equivalent of the component (b) and the component (c) is 4-19 parts by weight per part by weight of a solid content of the component (a).

8. The decorative board according to claim 7, wherein the blending amount of the silane coupling agent in the slurry is 0.01-0.5 parts by weight per part by weight of a solid content of the component (a).

9. The decorative board according to claim 1, wherein the slurry further comprises:
   a silane coupling agent; and
   wherein the blending amount of the silane coupling agent in the slurry is 0.01-0.5 parts by weight per part by weight of a solid content of the component (a),
   wherein a blending amount in solid equivalent of the amino-formaldehyde resin is 0.1-5 parts by weight per part by weight of a solid content of the phenol-formaldehyde resin in the slurry, and
   wherein a total blending amount in solid equivalent of the component (b) and the component (c) is 4-19 parts by weight per part by weight of a solid content of the component (a).

* * * * *

UNITED STATES PATENT AND TRADEMARK OFFICE
CERTIFICATE OF CORRECTION

PATENT NO. : 8,071,224 B2
APPLICATION NO. : 12/597243
DATED : December 6, 2011
INVENTOR(S) : Atsushi Iwasaki et al.

It is certified that error appears in the above-identified patent and that said Letters Patent is hereby corrected as shown below:

In column 11, line 47, in Claim 1, delete "prepeg" and insert -- prepreg --, therefor.

Signed and Sealed this
Twelfth Day of June, 2012

David J. Kappos
*Director of the United States Patent and Trademark Office*